United States Patent [19]
Lee

[11] Patent Number: 5,125,733
[45] Date of Patent: Jun. 30, 1992

[54] STEREOSCOPIC PROJECTOR AND METHOD FOR DRIVING PROJECTING LENSES

[75] Inventor: Dong H. Lee, Seoul, Rep. of Korea

[73] Assignee: Goldstar Co., Ltd., Seoul, Rep. of Korea

[21] Appl. No.: 647,993

[22] Filed: Jan. 30, 1991

[30] Foreign Application Priority Data
Jan. 31, 1990 [KR] Rep. of Korea ............... 1125/1990

[51] Int. Cl.[5] .................................................. G03B 35/00
[52] U.S. Cl. ...................................... 353/7; 359/462; 359/473; 359/477; 352/60; 352/57
[58] Field of Search .................. 353/7, 69, 94; 352/60, 352/57; 359/462, 466, 473, 475, 476, 477

[56] References Cited
U.S. PATENT DOCUMENTS

| | | | |
|---|---|---|---|
| 2,580,874 | 1/1952 | Wottring | 353/7 |
| 2,595,409 | 5/1952 | Reijnders | 350/130 |
| 2,598,573 | 5/1952 | Lutes | 353/7 |
| 2,968,217 | 1/1961 | Ewald | 353/7 |
| 3,418,044 | 12/1968 | Sheldon | 353/7 |
| 4,429,328 | 1/1984 | Jones, Jr. et al. | 353/7 |
| 4,915,497 | 4/1990 | Loth et al. | 352/60 |
| 4,997,270 | 3/1991 | Shaw | 352/57 |
| 5,001,555 | 3/1991 | Park | 350/130 |

FOREIGN PATENT DOCUMENTS
0267633 10/1989 Japan ............... 353/7

Primary Examiner—Allan N. Shoap
Assistant Examiner—William C. Dowling
Attorney, Agent, or Firm—Birch, Stewart, Kolasch & Birch

[57] ABSTRACT

A method and an apparatus for driving projecting lenses in a stereoscopic projector wherein a pair of projecting lenses are integrally driven so as to match (coincide) two images on a screen and simultaneously focus the images on the screen for producing a stereoscopic image, the apparatus comprising a driving device for moving the projecting lens holders forwardly and backwardly with respect to the screen, and inwardly and outwardly with respect to the optical axis of the screen, with maintaining the projecting lens holders in parallel to the optical axis of the screen so that images-matching and focusing on the screen can be accomplished, thereby avoiding any generation of keystoning phenomenon.

4 Claims, 7 Drawing Sheets

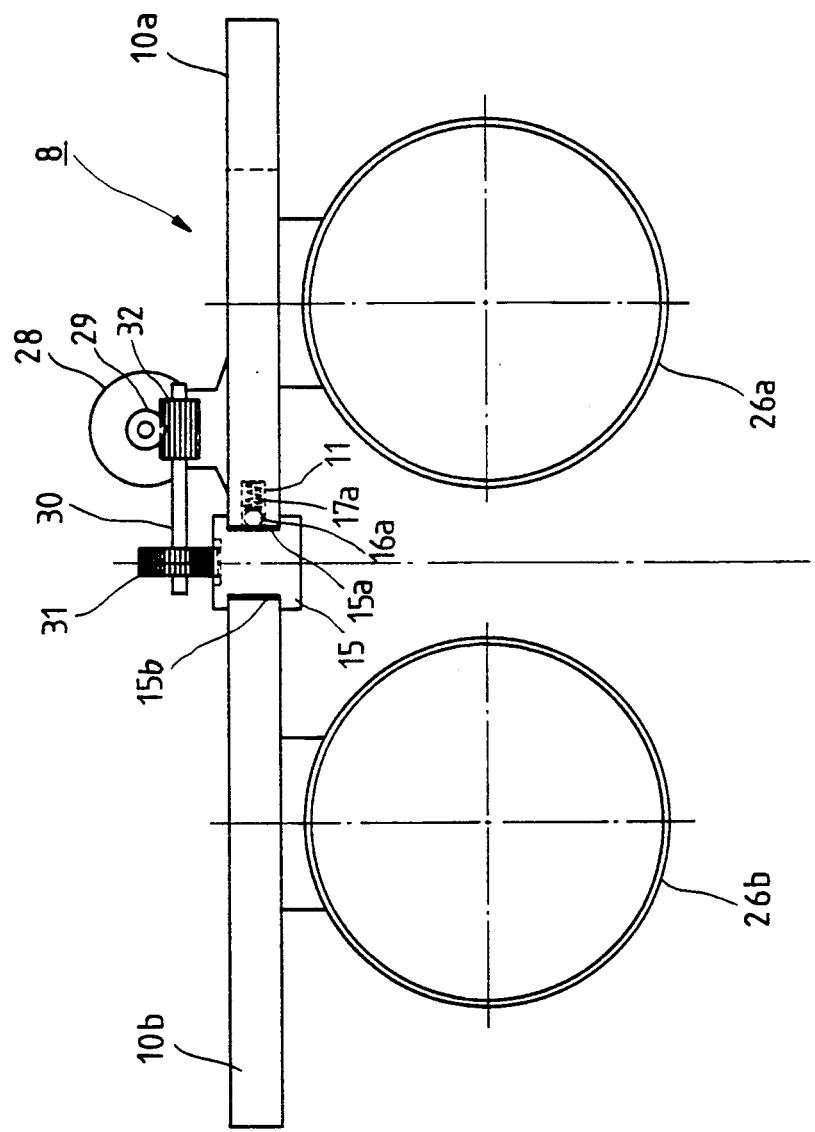

STEREOSCOPIC PROJECTOR AND METHOD FOR DRIVING PROJECTING LENSES

BACKGROUND OF THE INVENTION

The present invention relates to a stereoscopic projector, and more particularly to a method and an apparatus for driving projecting lenses in a stereoscopic projector wherein a pair of projecting lenses are integrally driven, so as to match (coincide) two images on a screen and simultaneously focus the images on the screen for producing a stereoscopic image, thereby avoiding a keystoning phenomenon.

Conventional stereoscopic image projectors, as shown in FIG. 1, generally comprises image-projecting units 1a and 1b each of which includes lamps 4a and 4b, spherical reflecting mirrors 3a and 3b, focusing lens devices 5a and 5b, slide films or LCD (Liquid Crystal Display Panel) panels 6a and 6b, and projecting lenses 7a and 7b. The units 1a and 1b are individually driven, in order to match two images and thus produce a stereoscopic image on a screen S. Specifically, producing the stereoscopic image on the screen S is accomplished by focusing an image from one unit 1a on the screen S to produce a distinct image, and then moving vertically and laterally another image focused on the screen S from the other unit 1b. Therefore, it is necessary to move vertically and laterally the unit 1b by itself.

In such a conventional stereoscopic projector, however, optical axes La and Lb are inclined at a certain angle with respect to the central axis L of screen S, so that left and right images on the screen S are projected in the shape of a trapezoid as shown in FIG. 7A. Thereby, a keystoning phenomenon is generated, that two images are not completely matched or coincided together, and thereby distorted.

Consequently, such a conventional projector has a disadvantage of increasing the fatigue of viewer's eyes in viewing stereoscopic images, due to the generated keystoning phenomenon. In addition, there is a disadvantage that matching images on the screen S becomes troublesome and inconvenient, because two image-projecting units 1a and 1b are individually driven and adjusted.

SUMMARY OF THE INVENTION

Therefore, an object of the present invention is to overcome the above-mentioned disadvantages encountered in the prior art and to provide a method and an apparatus for driving projecting lenses, wherein a pair of projecting lenses are integrally driven, thereby enabling simple, convenient, and accurate driving and adjustment thereof, avoiding a keystoning phenomenon, and thus avoiding the fatigue of viewer's eyes in viewing stereoscopic images.

Another object of the present invention is to provide a method for driving projecting lenses in a stereoscopic image projector, which comprises a pair of LCD panels and a pair of projecting lens holders each containing a projecting lens comprising arranging optical axes of the LCD panels in parallel to the center axis of a screen; arranging the projecting lens holders such that optical axes of projecting lenses are in parallel to the optical axes of LCD panels, respectively; and moving the projecting lens holders forwardly and backwardly with respect to the screen, and inwardly and outwardly with respect to the optical axis of the screen, with maintaining the projecting lens holders in parallel to the optical axis of the screen, so that images-matching and focusing can be accomplished.

A further object of the present invention provides an apparatus for projecting stereoscopic images comprising: a pair of LCD panels for forming images to be appeared; a pair of projecting lenses disposed in front of the LCD panels and adapted to project images on a screen; a pair of lamps disposed in rear of the LCD panels; a pair of spherical reflecting mirrors disposed in rear of the lamps and adapted to reflect forwardly lights from the lamps; a pair of projecting lens holders, each of projecting lens holder containing a projecting lens therein; a pair of light-concentrating lens devices disposed between respective lamps and respective LCD panels and adapted to concentrate lights emitted from the lamps on the projecting lenses; a case for containing all elements above-mentioned therein; and a driving device for moving the projecting lens holders forwardly and backwardly with respect to the screen, and inwardly and outwardly with respect to the optical axis of the screen, with maintaining the projecting lens holders in parallel to the optical axis of the screen, so that images-matching and focusing can be accomplished.

BRIEF DESCRIPTION OF THE DRAWINGS

The present invention will now be described by way of example with reference to the accompanying drawings, in which:

FIG. 6 is a front view of the device shown in FIG. 5; and

FIGS. 7A and 7B are schematic views of images produced on a screen in accordance with the prior art and the present invention, respectively, wherein FIG. 7A shows the images distorted due to the keystoning phenomenon generated in using a conventional stereoscopic projector, and FIG. 7B shows the matched or coincided images which can be produced, in view of the fact that a keystoning phenomenon is eliminated by using a stereoscopic projector of the present invention.

DETAILED DESCRIPTION OF THE PREFERRED EMBODIMENTS

Figure 1:
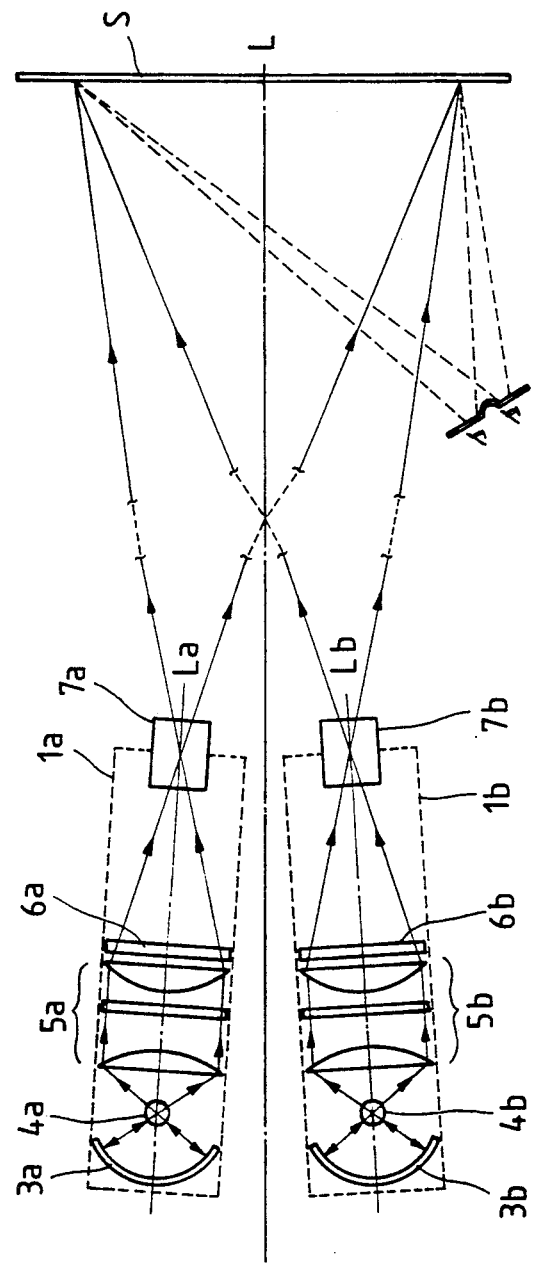
FIG. 1 is a schematic view of a conventional stereoscopic image projector.
Figure 2:
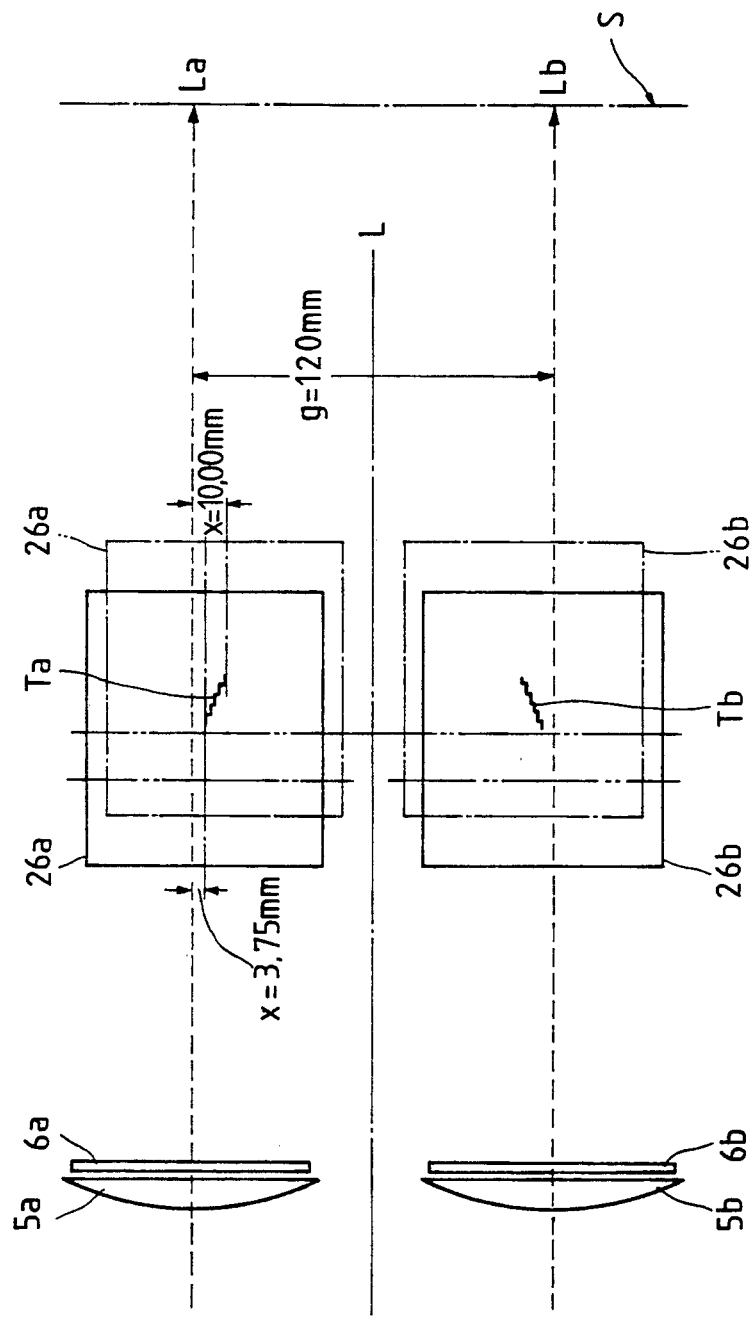
FIG. 2 is an explanation of the method for driving projecting lenses in accordance with the present invention.

FIG. 2 is a view for explaining a method for driving projecting lenses in accordance with the present invention. As shown in the drawing, respective optical axes La and Lb of LCD panels 6a and 6b are arranged in parallel with the central axis L of a screen S. Projecting lens holders 26a and 26b, each of which contains a projecting lens, are also arranged such that the optical axis of each projecting lens is in parallel with respective optical axes La and Lb of the LCD panels 6a and 6b. The projecting lens holders 26a and 26b are adjusted to move forwardly and backwardly with respect to the screen S and move inwardly and outwardly and in parallel with respect to the central axis L of the screen S, thereby enabling simultaneously focusing and matching images and thus avoiding any generation of keystoning phenomenon.

Figure 3:
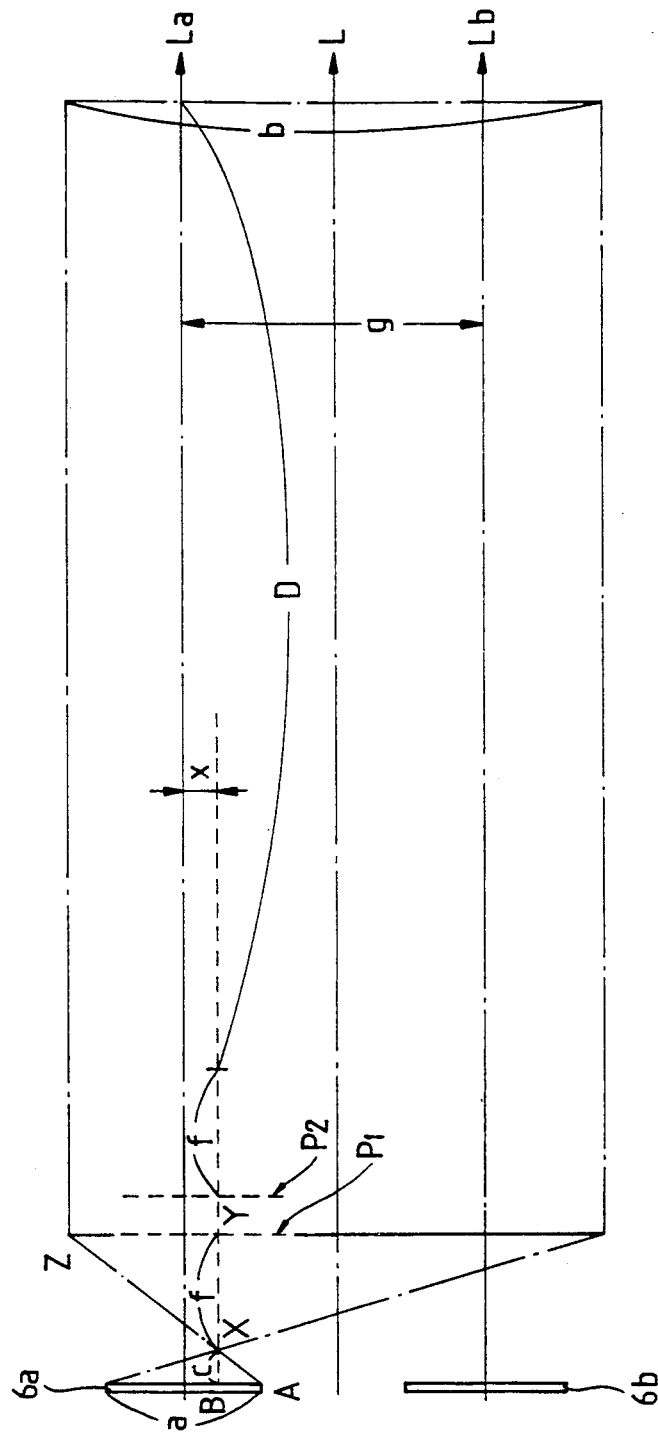
FIG. 3 is a schematic view for explaining the principle of the method for driving projecting lenses in accordance with the present invention.

FIG. 3 is a view more simplified than FIG. 2, in order to explain the principle of the method for driving projecting lenses in accordance with the present invention. As shown in FIG. 3, a pair of LCD panels 6a and 6b are arranged vertically and symmetrically. On respective optical axes La and Lb of the LCD panels 6a and 6b, projecting lenses are arranged, which are contained in holders 26a and 26b, respectively, as mentioned above in conjuction with FIG. 2. In FIG. 3, P1 and P2 designate first and second principal planes of projecting lens, respectively. If "b" is the size of the image produced on the screen S, "a" the size of LCD panel 6a, "g" the distance between optical axes of LCD panels La and Lb, "f" the focus length of the producing lens, and "c" the distance between the focus of producing lens and the LCD panel 6a, the magnification M of the projecting lens can be expressed by the following equation:

$$M = b/a = f/c = D/f \quad (1)$$

Also, the length x for moving the projecting lens toward the central axis of the screen S is determined, depending upon the magnification M determined by the equation (1). That is, the relationship between the movement length x and each of parameters a, c, b, g, and f can be expressed, on the basis of the theorem of similar figure for $\triangle ABX$ and $\triangle XYZ$, by the following equation:

$$a/2 = x:c = (b-g)/2 + x:f \quad (2)$$

If the equation (2) is arranged and then substituted for the equation (1), the following equation can be obtained:

$$x = g/2(M+1) \quad (3)$$

In the equation (3), the magnification M has the relationship based on the equation (1) with the distance c. The distance c is determined from the conjugate relationship with the first conjugate length c+f by the second conjugate length D+f to the screen S to be projected with images.

Therefore, for avoiding any keystoning phenomenon as well as accomplishing the two images-matching and focusing functions on the screen, in relation with the distance c determined by the production of distinct image on the screen, the optical axis of projecting lens should be moved toward and in parallel to the central axis of the screen by the distance x determined from the equation (3).

FIG. 2 shows a computer graphic, on a reduced scale of 0.5, of a stereoscopic projector of an embodiment of the present invention, wherein f is 120 mm, g 120 mm, the range of the magnification 5 to 15. Data for the stereoscopic projector is indicated in the following table. As apparent from the table, the distance c varies in the range of 24 to 8 mm, the second conjugate length D+f 720 to 1,920 mm, and the distance ×10 to 3.75 mm.

TABLE

| example | data | (mm) |
| --- | --- | --- |
| c | 24 | 8 |

TABLE-continued

| example | data | (mm) |
| --- | --- | --- |
| c + f | 144 | 128 |
| D | 600 | 1,800 |
| D + f | 720 | 1,920 |

In FIG. 2, projecting lens holders 26a and 26b, in which projecting lenses are disposed, are shown in solid lines showing the condition when positioned toward LCD panels 6a and 6b and in phantom lines showing the condition when positioned away from LCD panels 6a and 6b. The projecting lens holders 26a and 26b indicated in solid lines shows the case that imaged from LCD panels 6a and 6b are projected with the magnification of 15 on the screen S disposed at the position wherein the second conjugate length is 1,920 mm. On the other hand, the projecting lens holders 26a and 26b indicated in phantom lines shows the case that images from LCD panels 6a and 6b are projected with the magnification of 5 on the screen S disposed at the position wherein the second conjugate length is 720 mm. Depending upon the magnification in projecting images, therefore, projecting lens holders 26a and 26b vary their positions between the position in solid lines and the position in phantom lines, along traces Ta and Tb arranged symmetrically with respect to the central axis L of the screen S.

Hereinafter, the apparatus for driving projecting lenses, which can accomplish the above-mentioned method for driving projecting lenses in accordance with the present invention, will be described.

Figure 4:
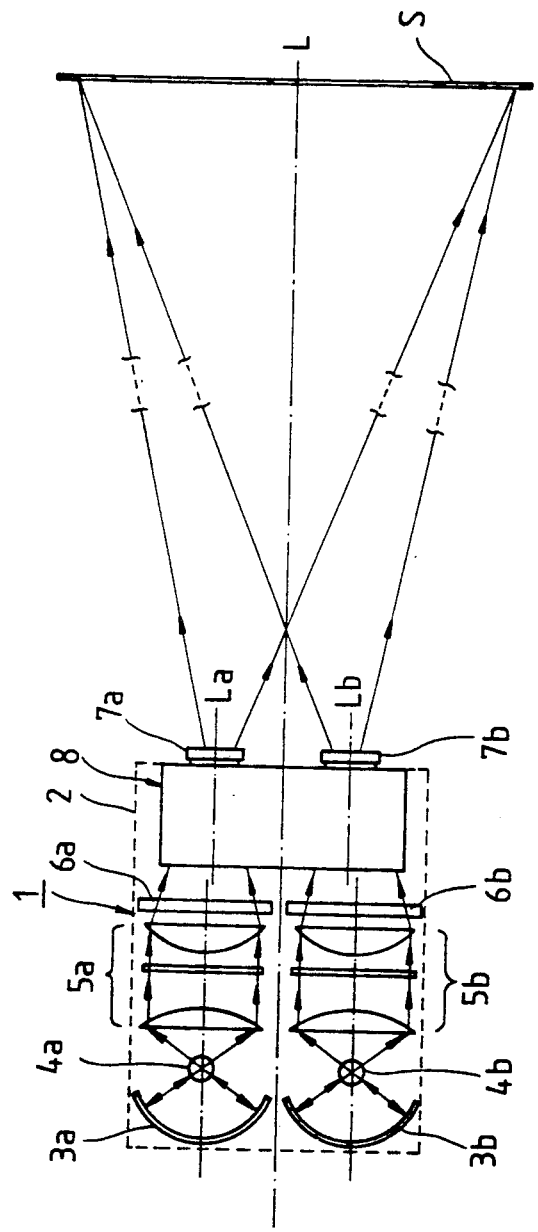
FIG. 4 is the schematic view of a stereoscopic projector in accordance with the present invention.
Figure 5:
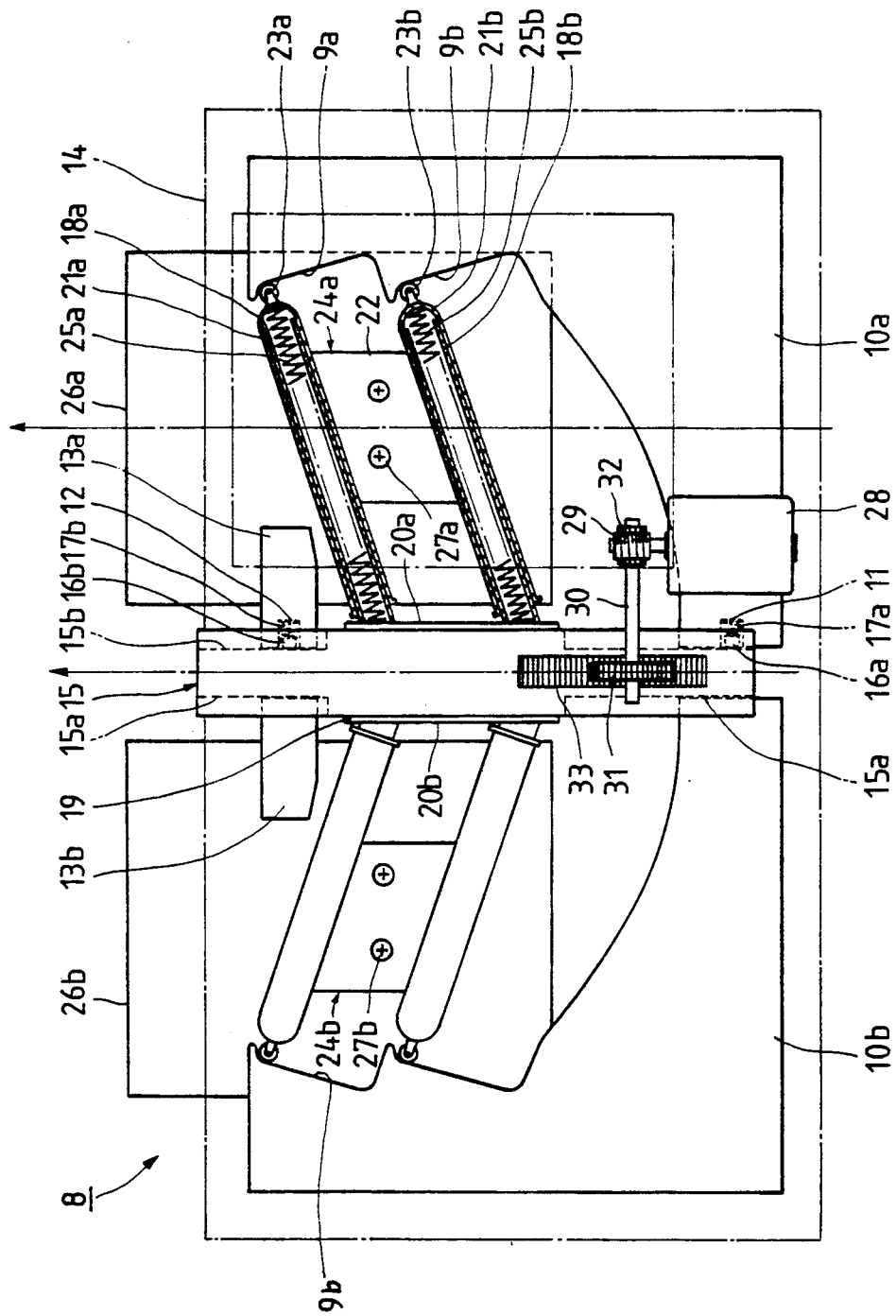
FIG. 5 is a partially broken-out plan view of a device for driving projecting lenses in accordance with the present invention.

Referring to FIGS. 4 to 6, there is shown an apparatus for driving producing lenses in accordance with the present invention. In the drawings, reference numeral "1" designates a projecting unit of an integrated type. The unit 1 has a case 2 in which a pair of spherical reflecting mirrors 3a and 3b, a pair of lamps 4a and 4b, a pair of devices for concentrating lights 5a and 5b, a pair of LCD panels or slide films 6a and 6b, and a pair of projecting lenses 7a and 7b are contained. One of each element pair is disposed symmetrically with the other. The projecting lenses 7a and 7b are integrated with an projecting lenses driving device 8, in order to simultaneously carry out images-matching and focusing functions.

As shown in FIGS. 5 and 6, the driving device 8 comprises a pair of slider-supporting members 10a and 10b arranged symmetrically with each other to form a space therebetween. Each of slider-supporting members 10a and 10b is provided, at the inner edge of one end thereof, with a pair of inclined guide surfaces 9a and 9b shaped into a step-type. At the other end, each of slider-supporting members 10a and 10b is provided with a supporting hole 11. Behind the supporting hole 11, a pair of subsidiary slider-supporting members 13 and 13b are arranged symmetrically with each other to form a space therebetween. Each of assistant slider-supporting members 13a and 13b has a supporting hole 12 at one end thereof. These slider-supporting members 10a and 10b and second slider-supporting members 13a and 13b are fixedly mounted on a case 14 of the driving device 8.

A slider 15 is disposed to extend between the slider-supporting members 10a and 10b and the subsidiary slider-supporting members 13a and 13b. The slider 15 has at the front end thereof, a pair of guide grooves 15a in which respective other ends of slider-supporting members 10a and 10b can slidably move. The slider 15 also has at the rear end thereof a pair of guide grooves 15b in which respective one ends of subsidiary slider-supporting members 13a and 13b can slidably move. In each supporting hole 11 of slider-supporting members 10a and 10b, a ball 16a and a compression spring 17a outwardly biasing the ball 16a are disposed, in order to provide a smooth sliding of the slider-supporting members 10a and 10b on guide grooves 15a. In each supporting hole 12 of subsidiary slider-supporting members 13a and 13b, a ball 16b and a compression spring 17b outwardly biasing the ball 16b are also disposed, in order to provide a smooth sliding of the subsidiary slider-supporting members 13a and 13b.

At the middle portion of the slider 15, a pair of slider arms 20a and 20b are fixedly mounted on both side of the slider 15, respectively. Each of slider arms 20a and 20b has a slider armfixing member 19 and a pair of supporting pipes 18a and 18b extending in parallel with each other and inclinedly at a certain angle from said fixing member 19.

A pair of carriers 24a and 24b are fitted around the slider arms 20a and 20b, in order to slide along them, respectively. Each of carriers 24a and 24b comprises a pair of sliding pipes 21a and 21b extending in parallel with each other and inclinedly at a certain angle so as to be slidably fitted around supporting pipes 18a and 18b of each of slider arms 20a and 20b, respectively, a connecting plate 22 adapted to connect said sliding pipes 21a and 21b, a pair of rollers 23a and 23b mounted on respective outer ends of sliding pipes 21a and 21b and adapted to contact with inclined guide surfaces 9a and 9b of each of slider-supporting members 10a and 10b, respectively, and a pair of compression springs 25a and 25b disposed in supporting pipes 18a and 18b of each of slider arms 20a and 20b and adapted to outwardly bias sliding pipes 21a and 21b for always contacting the rollers 23a and 23b with inclined sliding surfaces 9a and 9b, respectively. According to this construction, the carriers 24a and 24b can be moved along traces defined by guide surfaces 9a and 9b of each of slider-supporting members 10a and 10b, respectively. Therefore, the carriers 24a and 24b are designed to adjust projecting lens holders 26a and 26b, thereby accomplishing the images-matching and focusing.

To this end, projecting lens holders 26a and 26b, in which projecting lens 7a and 7b are respectively disposed, are fixed to respective connecting plates 22 of carriers 24a and 24b, so as to be driven integrally therewith.

A driving motor 28 is fixedly mounted on the slider-supporting member 10a. To the shaft end of the motor 28, a worm 29 is fixed, to which a worm gear 32 fixed to one end of a shaft 30 is engaged. To the other end of the shaft 30, a gear 31 is fixed, to which a rack 33 formed on the upper surface of the slider 15 is engaged.

In this construction of projecting lenses driving apparatus, as the driving motor 28 is actuated, the worm 29 and the worm gear 32 engaged with said worm 29 rotates, thereby causing the shaft 30 and thus the gear 31 to rotate. The rotation of the gear 31 causes the rack 33 engaged therewith to move forwardly and backwardly.

Consequently, the slider 15 moves forwardly and backwardly. At this time, the movement of the slider 15 is guided by slider-supporting members 10a and 10b and subsidiary slider-supporting members 13a and 13b. During the movement of the slider 15, frictions generated between the slider 15 and all slider-supporting members 10a and 10b and subsidiary slider-supporting members 13a and 13b are minimized, by means of the balls 16a and 16b and the compression springs 17a and 17b.

Accordingly, as the slider 15 moves forwardly and backwardly, the carriers 24a and 24b move away from and toward the slider arms 20a and 20b, respectively, and along respective traces of guide surfaces 9a and 9b, by means of the biasing forces of the compression springs 25a and 25b.

By the movement of the carriers 24a and 24b, the projecting lens holders 26a and 26b fixedly mounted thereon move laterally and longitudinally, thereby causing images produced on the screen to be distinct.

The projecting lens driving device mentioned above is designed such that moving traces Ta and Tb (FIG. 2) of projecting lenses defined by respective guide surfaces 9a and 9b of slider-supporting members 10a and 10b satisfy the above-mentioned equation (3). These moving traces Ta and Tb are necessary to distinctly produce images on the screen S and simultaneously match correctly images projected from two projecting lenses 7a and 7b. However, the equation (3) can be applied only when the traces Ta and Tb of projecting lenses 7a and 7b are symmetrical with respect to the center axis L of the screen.

Figure 7A:
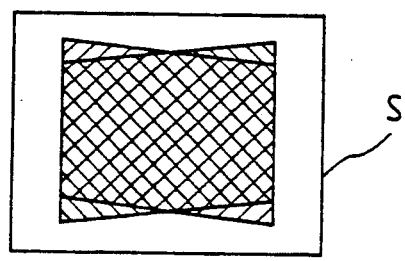
Figure 7B:
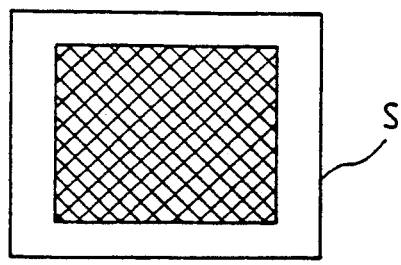

FIG. 7B shows that images produced by the stereoscopic projector to which the present invention is applied, have been matched such that their edges are completely coincided with each other, thereby avoiding any generation of the keystoning phenomenon.

As apparent from the above description, the present invention drives integrally projecting lenses of a pair of projecting units so as to simultaneously accomplish the two images matching function and the focusing function. Accordingly, driving or adjustment of the stereoscopic projector can be easily and accurately carried out, so that the generation of keystoning phenomenon can be avoided, thereby provid ing an advantage of eliminating the fatigue of viewer's eyes in viewing stereoscopic images.

Although the present invention has been shown and described with respect to a particular embodiment, various changes and modifications which are obvious to a person skilled in the art to which the present invention pertains are deemed to lie within the spirit, scope and contemplation of the invention.

What is claimed is:

1. A steroscopic projector comprising:
   a pair of LCD (liquid crystal display) panels for forming images to be appeared;
   a pair of projecting lenses disposed in front of said LCD panels and adapted to project images on a screen;
   a pair of lamps disposed in the rear of said LCD panels;
   a pair of spherical reflecting mirrors disposed in the rear of said pair of lamps and adapted to reflect forwardly lights from said pair of lamps;
   a pair of projecting lens holders, each of pair of projecting lens holders containing a projeting lens therein;
   a pair of light-concentrating lens devices disposed between respective lamps and respective LCD panels and adapted to concentrate lights emitted from the lamps on said projecting lenses;
   a case for containing a pair of LCD, projecting lenses, lamps, reflecting mirrors, projecting lens holders, and light-concentrating lens devices disposed therein; and a driving device for moving said projecting lens holders forwardly and backwardly with respect to said screen and inwardly and outwardly with respect to said optical axis of the screen, with maintaining said projecting lens holders in parallel to the optical axis of the screen so that images-matching and focusing can be accomplished, said driving device including a pair of slider-supporting members each provided, at the inner surface of one end thereof with a pair of step-shaped inclined guide surfaces, a pair of subsidiary slider-supporting members disposed in front of said slider-supporting members, a slider disposed between the slider-supporting members for moving forwardly and backwardly, means for driving said slider, a pair of slider arms fixedly mounted, at the middle portion of said slider, on both sides of the slider, respectively, each of said slider arms having a pair of inclined supporting pipes extending in parallel with each other, and a pair of carriers fitted around said slider arms for sliding along them, respectively, each of said carriers containing a pair of inclined sliding pipes slidably fitted around said inclined supporting pipes, respectively, a connecting plate adapted to connect said sliding pipes and support one image-projecting lens holder, a pair of rollers mounted to respective outer ends of the sliding pipes and adapted to contact with inclined guide surfaces of each of sub-slider-supporting members, respectively, and a pair of compression springs disposed in the supporting pipes of each of the slider arms and adapted to outwardly bias sliding pipes for always contacting said rollers with inclined sliding surfaces, respectively, thereby causing the projecting lens holder to move along the trace defined by guide surfaces of each of slider-supporting members, respectively.

2. The steroscopic projector of claim 1, wherein said case, respective pairs of said spherical reflecting mirrors, said lamps, said light-concentrating lens devices, said LCD panels, and said projecting lens holders containing projecting lenses are arranged symmetrically with respect to the cetner axis of said screen, and the optical axes of said LCD panels are arranged in parallel to the central axis of the screen.

3. The steorscopic projector of claim 1, wherein said slider-driving means includes a driving motor mounted to one of said slider-supporting members, a worm gear fixed to the shaft of said motor, a rack formed on the surface of the slider, a gear engaged with said rack, a worm gear geared with said worm gear and adapted to be rotatable integrally with said gear engaged with the rack, by means of a shaft so that the slider moves forwardly and backwardly by the driving force of the motor.

4. The steorscopic projector of claim 1, wherein each of said slider-supporting members and said subsidiary slider-supporting members has a supporting hole faced to the outer surface of said slider, a ball adapted to contract with the outer surface of the slider, and a compression spring biasing said ball against the outer surface of the slider.

* * * * *